July 13, 1926.
C. N. FAIRCHILD
1,592,087
STEERING POST LOCK
Filed May 18, 1923
2 Sheets-Sheet 1
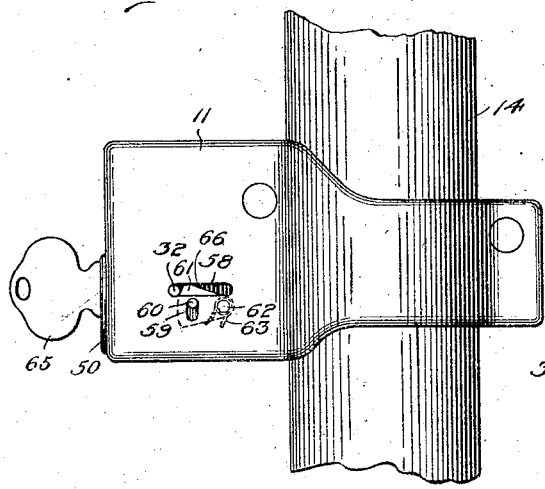
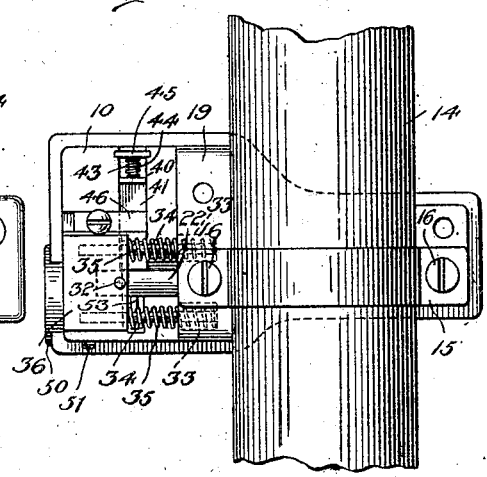
Inventor
Charles N. Fairchild
By Church & Church
His Attorneys July 13, 1926. 1,592,087
C. N. FAIRCHILD
STEERING POST LOCK
Filed May 18, 1923 2 Sheets-Sheet 2
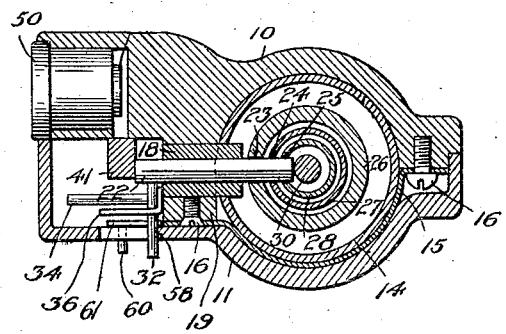
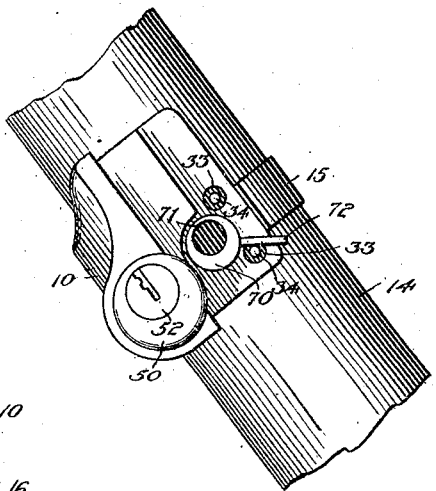
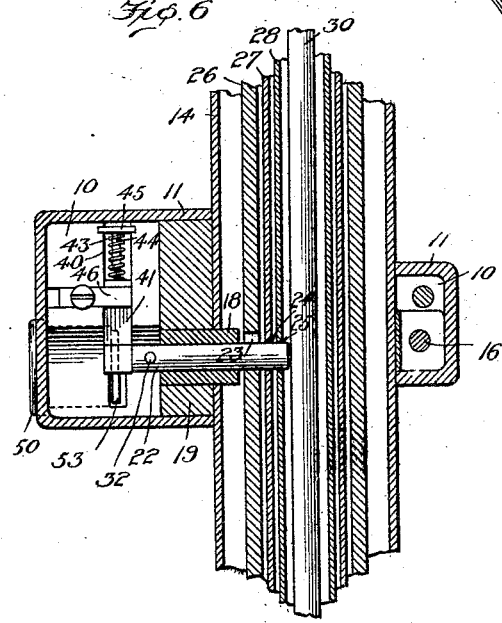
Inventor
Charles N. Fairchild
By Church & Church
His Attorneys Patented July 13, 1926.

1,592,087

UNITED STATES PATENT OFFICE.

CHARLES N. FAIRCHILD, OF NEW YORK, N. Y., ASSIGNOR TO FAIRCHILD LOCK CORPORATION, OF THE COUNTY OF NEW CASTLE, DELAWARE.

STEERING-POST LOCK.

Application filed May 18, 1923. Serial No. 639,866.

This invention relates to steering post locks of the type usually employed for automobiles and has for its principal object the provision of a secure means for locking the various tubes within the steering post to prevent the unauthorized use of a machine.

A further object of the present invention lies in the provision of an automatic safety lock which is postively locked against movement while the automobile is in use thereby preventing accidents which have heretofore occurred by an unintentional locking of the tube members while the automobile is being driven. A further object of the present invention lies in the provision of means for permitting a tightening up of the steering post tube without altering the efficiency of the lock.

The present invention like a number of other locks on the market embraces the outer steering post casing and carries a locking pin which enters alined slots in the outer tube or casing, the steering tube, the quadrant tube which like the outer casing is stationary, the gas control tube, and, if desired, the spark control rod, the locking of the latter however being entirely optional and is not described in the description following, which for the sake of clearness will be drawn to the invention as applied to a Hudson car.

The Board of Underwriters has issued certain specific rules for automobile locks among others that the lock must be a permanent attachment on the steering post casing and that the lock shall automatically open upon operation of the key. A requirement not present in any other lock as far I know and obviously not required by the authorities, but which is very important lies in the provision of means permitting the tightening of the steering tube. While there is no particular need for having the tube relatively tight a great many drivers prefer to reduce the amount of play in this tube to a minimum and hence the custom has arisen of tightening the nut at the bottom of the tube and allowing as slight a play of the worm as is permissible. Then, too, it is at times really necessary to tighten the steering tube to allow for wear of the worm. In each case the steering post tube is drawn down and if no provision is made for the movement of this tube the hole through the tube will have to be rebored. I avoid this difficulty by forming a slot in the steering tube so as to permit maximum amount of tightening of this element.

In the drawings,—

Figure 1 is a side elevation of the device as applied to the steering post, the term "side elevation" considering the steering post as vertical.

Fig. 2 is a similar view but with the cover removed.

Fig. 3 is a bottom plan view.

Fig. 4 is an edge elevation.

Fig. 5 is a section through the locking pin and lock and therefore at right angles to the axis of the steering post.

Fig. 6 is a section taken through the axes of the locking pin and steering post.

Fig. 7 is a section through the bolt and showing the use of the eccentric for drilling the slot in the steering tube.

The housing is in two sections 10 and 11, for convenience in description, however, the word housing will be applied to the major portion 10 only, save in the claims, and the upper portion of the housing will be referred to as the cover 11. The lower or major portion of the housing is secured to the steering post 14 by a steel strap 15 secured to the housing in any desired fashion as by the headed machine screws 16. The strap provides a fairly firm connection and is ample to secure the housing in place while a fairly large hole is drilled through the outer casing or post 14 in alinement with the hole in the casing which snugly receives the bushing 18 which extends entirely through the inner upper wall 19 of the housing and also entirely through the casing or post 14. The obvious effect of this bushing 18 is positively to prevent rotation of the housing with respect to the steering post so that the combination of bushing and strap prevents all relative movement of the housing and post.

Within the bushing 18 and centrally thereof I mount a locking pin 22 which slides through the bushing and through alined holes 23, 24 and 25, in the steering tube 26, the stationary quadrant tube 27 and the gas control tube 28, respectively, and may, if desired, pass into or through the spark rod 30, but I prefer that the locking pin be shorter than would be required if it is to pass into the rod 30, particularly since there is no special purpose gained by locking the spark control rod. Near its outer end the locking pin 22 carries a stud 32 preferably at right angles thereto and serving as a handle for the locking pin to press same into locked position, that is, into the through passageway formed by the alined holes 23, 24 and 25.

The wall 19 of the housing is counterbored as at 33 and coaxially of the two counterbores I mount guide rods 34 which extend above, to one side of, and parallel to the axis of the locking pin. Mounted on the guide rods 34 and extending within the counterbores 33 are springs 35 which tend to urge the angular member 36, which I will hereafter term the shield, in a direction away from the wall of the housing. As seen in Figs. 1 and 4 the locking pin stud 32 extends centrally through the shield 36, and the springs 35 therefore tend to move the locking pin to unlocked position and therefore against the cover 11 when the latter is in place. The depth of the bores 33 is such that the shield 36 may move tight against the wall 19, in other words, the bores are deep enough to accommodate the springs 35 when compressed.

Within a slot 40 in the housing 10 I mount a bolt 41 which is adapted to cross the path of the locking pin 22. The bolt is spring-pressed preferably by a spring 43 mounted on a short rod 44 secured to the casing or preferably to a small plate 45 secured in the casing to close the outer end of the slot 40. A stop 46 is secured to the housing 10 to limit the downward movement of the bolt so that at the extreme limit of its travel it will just cover the outer face of the locking pin.

A lock 50, preferably of the Yale type, is permanently secured in the housing in any preferred manner as for example by the small locking screw 51. Secured to the inner end of the barrel 52 of this lock is a small lug 53 which, while normally lying beneath the bolt 41, may be turned into position to engage the bolt and to move it upwardly against the tension of the spring 43 which action will permit the locking pin 22 to move outwardly under the urge of the springs 35.

As best seen in Fig. 1 there are two slots in the cover or top section of the housing, a relatively long one 58 for the locking pin stud 32 and a comparatively short one 59 which accommodates a stud 60 on the safety latch 61 which is pivoted to the casing as at 62 and is urged by a spring 63 into the position shown in Fig. 1, wherein the safety latch 61 is shown as preventing movement in any direction of the locking pin by holding the locking pin stud at the extreme end of the slot 58. By moving the stud 60, however, the latch 61 is moved out of the path of the stud 32 and the latter may be moved to locked position. Upon operation of the lock barrel 52 by its key 65 the locking pin is shot into unlocked position and since the stud 32 strikes against the beveled edge 66 and also in view of the very much greater strength of the springs 35 than the spring 63 practically no resistance is offered by the latch to the unlocking movement of the locking pin.

The installation of the lock is relatively simple. I apply the lower section of the housing to the post at any desired distance from the top of the post and bind it securely in place by applying the strap 15 and tightening the screws 16. I then bore a hole through the outer casing or steering post of the same size as the hole in the wall 19, this size being preferably one-half inch in diameter. Before placing the bushing 18 in place I first insert in the alined holes in the wall 19 and in the steering post a cylindrical member 70 of exactly the same diameter as the bushing and push this member or jig through the holes until it is in contact with the steering tube.

In this member 70 is a hole 71 preferably slightly larger than the diameter of the locking pin 22 and somewhat offset or eccentric with relation to the axis of the member 70. By means of the lug or handle 72 the member 70 is rotated in the alined holes until the axis of the eccentric hole 71 is in the plane of the axes of the steering post and the locking pin and above the axis of the locking pin. The appropriate cutting tool is now inserted in the eccentric hole 71 and a hole drilled entirely through the steering tube 26. The member 70 is now withdrawn and the permanent bushing 18 inserted in the alined holes in the wall 19 of the housing and in the steering post 14.

The cutting tool is now inserted in the central hole in the bushing and a hole drilled through the steering post 26, the stationary quadrant tube 27, and the gas control tubes 28, forming a through passageway for the locking pin. The effect of boring the two holes through the steering tube 26 is that a slot is formed in this member whereas in the other members a simple cylindrical hole is formed. The purpose of this is to permit tightening of the bolt which holds the worm at the bottom of the steering tube the result of which tightening is invariably to draw the steering tube downwardly.

By providing the slot, sufficient play is permitted so that the steering post may be drawn down to the greatest possible extent and still leave a clear passage through the steering tube for the locking pin. The locking pin with its lug is next assembled with the angle or shield 36 which obstructs the slot in the cover, and these parts are pushed into locking position and are so held by the bolt while the cover is being put on.

The cover is next applied and the two parts of the housing are assembled in any preferred manner. I have found it advisable to use screws having a portion of the head hardened and the outer portion of relatively soft steel so that when I drive the screws to a firm seat I may grind or otherwise remove all of the soft steel which contains the kerf and leave a perfectly smooth hardened head of the screw thus preventing removal of the casing.

What I claim is:

1. A steering post lock of the type including a housing, a locking pin slidable therein, a bolt for preventing retraction of the locking pin when in locked position, a lock secured in the housing, means carried by the lock for withdrawing the bolt from pin locking position, means for moving said bolt to pin locking position, and means for restoring the pin to unlocked position; characterized by the locking pin lying entirely to one side of the path of the bolt when in locked position.

2. A steering post lock of the type including a housing, a locking pin slidable therein, a bolt for preventing retraction of the locking pin when in locked position, a lock secured in the housing, means carried by the lock for withdrawing the bolt from pin locking position, and spring means for restoring the pin to unlocked position; comprising a stud on the pin at right angles thereto.

3. A steering post lock of the type including a housing, a locking pin slidable therein, a bolt for preventing retraction of the locking pin when in locked position, a lock secured in the housing, means carried by the lock for withdrawing the bolt from pin locking position, and spring means for restoring the pin to unlocked position; comprising a slot in the casing and a stud on said pin movable in said slot.

4. A steering post lock of the type including a housing, a locking pin slidable therein, a bolt for preventing retraction of the locking pin when in locked position, a lock secured in the housing, means carried by the lock for withdrawing the bolt from pin locking position, and means for restoring the pin to unlocked position; characterized by the provision of means for preventing movement of the pin to locked position.

5. A steering post lock of the type including a housing, a locking pin slidable therein, a bolt for preventing retraction of the locking pin when in locked position, a lock secured in the housing, means carried by the lock for withdrawing the bolt from pin locking position, and means for restoring the pin to unlocked position; characterized by the provision of a stud on said pin, a slot in said casing through which said stud moves and a member connected to said stud for movement therewith to obstruct said slot when the pin is in locked position.

6. A steering post lock of the type including a housing, a locking pin slidable therein, a bolt for preventing retraction of the locking pin when in locked position, a lock secured in the housing, means carried by the lock for withdrawing the bolt from pin locking position, and means for restoring the pin to unlocked position; characterized by the pin restoring means lying to one side of the axis of the pin.

7. In a lock, a bolt, a plurality of guides parallel thereto, a slot obstructing member slidable on said guides, springs on said guides engaging said member, and a handle on said bolt and movable with said member at right angles thereto.

8. In a steering post lock, a housing having a slot therein, a steering post locking pin slidably mounted in said housing and having a manually operated handle projecting thru said slot, means for preventing movement of said pin to locking position and means movable with said pin for obstructing said slot when said pin is in locking position.

9. In a steering post lock, a housing, a spring retracted pin normally urged into unlocked position, a safety catch to prevent movement of said pin to locking position, a spring pressed bolt tripped into position behind said locking pin when said locking pin moves to locked postion, and key operated means for simultaneously restoring said bolt and pin to unlocked position.

CHARLES N. FAIRCHILD.